(12) United States Patent
Nguyen et al.

(10) Patent No.: US 10,397,074 B2
(45) Date of Patent: *Aug. 27, 2019

(54) PROVIDING MESSAGE FLOW ANALYSIS FOR AN ENTERPRISE SERVICE BUS

(75) Inventors: Filip Nguyen, Brno (CZ); Filip Elias, Vysni Lhoty (CZ)

(73) Assignee: Red Hat, Inc., Raleigh, NC (US)

( * ) Notice: Subject to any disclaimer, the term of this patent is extended or adjusted under 35 U.S.C. 154(b) by 914 days.

This patent is subject to a terminal disclaimer.

(21) Appl. No.: 13/593,646

(22) Filed: Aug. 24, 2012

(65) Prior Publication Data

US 2014/0059204 A1    Feb. 27, 2014

(51) Int. Cl.
*G06F 15/173*    (2006.01)
*H04L 12/26*    (2006.01)

(52) U.S. Cl.
CPC ........ *H04L 43/045* (2013.01); *H04L 43/0888* (2013.01)

(58) Field of Classification Search
CPC ... H04L 47/10; H04L 2012/445; G06Q 10/10; H03L 12/1859; H03L 12/5855
See application file for complete search history.

(56) References Cited

U.S. PATENT DOCUMENTS

| | | | | |
|---|---|---|---|---|
| 2001/0046856 A1* | 11/2001 | McCann | | H04L 63/10 455/423 |
| 2004/0062201 A1* | 4/2004 | Deshpande | | H04L 47/10 370/235 |
| 2005/0256931 A1* | 11/2005 | Follmeg | | G06Q 10/10 709/206 |
| 2006/0098647 A1* | 5/2006 | Muehl | | H04L 43/026 370/389 |
| 2006/0107335 A1* | 5/2006 | Frank | | G06F 21/10 726/27 |
| 2007/0038703 A1* | 2/2007 | Tendjoukian | | H04L 67/327 709/206 |
| 2007/0129090 A1* | 6/2007 | Tarn | | H04L 51/04 455/466 |
| 2009/0144413 A1* | 6/2009 | Khan | | H04L 67/025 709/224 |
| 2009/0288101 A1* | 11/2009 | Gandin | | G06F 9/4812 719/314 |

(Continued)

OTHER PUBLICATIONS

IBM Paterns (IBM, International Technical Support Organization, Patterns: SOA Design Using WebSphere Message Broker and WebSphere ESB, Jul. 2007, http://www.redbooks.ibm.com/redbooks/pdfs/sg247369.pdf).*

(Continued)

*Primary Examiner* — Umar Cheema
*Assistant Examiner* — Gregory P Tolchinsky
(74) *Attorney, Agent, or Firm* — Lowenstein Sandler LLP (57) ABSTRACT

A mechanism for providing message flow analysis for an enterprise bus service (ESB) system is disclosed. A method includes identifying, by a computing device executing the ESB system, messages exchanged in the ESB system in a time interval. The method also includes recording, by the computing device, a number of the identified messages exchanged in the time interval. The method further includes generating, by the computing device, a result that depicts the recorded number of the identified messages in the time interval.

14 Claims, 5 Drawing Sheets

(56) References Cited

U.S. PATENT DOCUMENTS

| | | | | |
|---|---|---|---|---|
| 2009/0319686 A1* | 12/2009 | Watanabe | ............... | H04L 45/00 709/240 |
| 2010/0121972 A1* | 5/2010 | Samuels | ............... | H04L 41/082 709/231 |
| 2011/0167494 A1* | 7/2011 | Bowen | ................. | G06F 21/566 726/24 |

OTHER PUBLICATIONS

IBM, International Technical Support Organization, Migrating to WebSphere Message Broker Version 6.0, Mar. 2006, pp. 44-45, Statistics and accounting, http://www.redbooks.ibm.com/redbooks/pdfs/sg247198.pdf.*

IBM, Using IBM Tivoli OMEGAMON XE for WebSphere Integration Brokers Fourth Edition, Apr. 2005, http://publib.boulder.ibm.com/tividd/td/ITOMEGAXEfWIB/SC31-6890-00/en_US/PDF/qi130us0.pdf.*

IBM, Using IBM Tivoli OMEGAMON XE for WebSphere Integration Brokers Fourth Edition, Apr. 2005, pp. 113-114, http://publib.boulder.ibm.com/tividd/td/ITOMEGAXEfWIB/SC31-6890-00/en_US/PDF/qi130us0.pdf.*

Gregor Hohpe and Bobby Woolf, "Enterprise Integration Patterns: Designing, Building, and Deploying Messaging Solutions"; Addison-Wesley Signature Series, 2003 (pp. 57-141, and pp. 225-326).

R. Credle, et al. "Patterns: SOA Design Using WebSphere Message Broker and WebSphere ESB", IBM Redbooks, WebSphere Software, IBM.com/redbooks, http://www.redbooks.ibm.com/redbooks/pdfs/sg247369.pdf, pp. 53-80.

"Create ESB Process in Sonic Workbench", Progress; http://documentation.progress.com/output/us/OpenEdge_latest/dvesb/create-esb-process-in-sonic-workbench.html; 5 pages.

IBM WebSphere Developer Technical Journal: Building an Enterprise Service Bus Using WebSphere ESP, Part 2; WebSphere ESB, IBM WebSphere Developer Technical Journal; http://www.ibm.com/developerworks/websphere/techjournal/0612_reinitz/0612_reinitz.html, 17 pages.

Mateo Almenta Reca, "Mule Studio Beta is coming!", MuleSoft Blog, http://blogs.mulesoft.org/mule-studio-beta/, Mar. 10, 2011, 10 pages.

"API Testing", Parasoft, http://www.parasoft.com/jsp/solutions/soa_solution.jsp?, 5 pages.

* cited by examiner

PROVIDING MESSAGE FLOW ANALYSIS FOR AN ENTERPRISE SERVICE BUS

TECHNICAL FIELD

The embodiments of the invention relate generally to a computer system and, more specifically, relate to a mechanism for providing message flow analysis for an enterprise service bus.

BACKGROUND

Enterprise service bus (ESB) is a software architecture model used for designing and implementing the interaction and communication between mutually interacting software applications in a service oriented architecture. Information within ESB is conveniently packaged, transferred, and stored in a form of message. One of the primary functions of the ESB is to monitor and control routing of messages between services or clients. A message is any type of communication received by the ESB and generated within the ESB. Some examples of the messages generated within the ESB include, but are not limited to, JBoss™ message, Hypertext Transfer Protocol (HTTP) message, File Transfer Protocol (FTP) message, etc.

In an ESB, it is often difficult to keep track of the flow of messages. Currently, an administrator may use proprietary logging messages to record the flow of messages in a log file. However, this is a very unstable approach as it is difficult for the administrator to view a cluttered log file that captures a large amount of message flows.

Another known technique to track the flow of messages in an ESB is the use of flow visualization of network traffic, which shows behavior of packets in a network. Yet another technique is message flow statistics visualizer (also known as WebSphere™ Message Broker), which provides a graphical means for viewing message flow statistics. The message flow statistics visualizer generates statistics of messages in a message queue and provides graphical means for viewing the statistics. However, none of above techniques provide for recording flow information of the messages.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding of the various embodiments of the invention.

DETAILED DESCRIPTION

Embodiments of the invention provide a mechanism for providing message flow analysis for an enterprise bus service (ESB) system is disclosed. A method includes identifying, by a computing device executing an enterprise service bus (ESB) system, messages exchanged in the ESB system in a time interval. The method also includes recording, by the computing device, a number of the identified messages exchanged in the time interval. The method further includes generating, by the computing device, a result that depicts the recorded number of the identified messages in the time interval.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "recording", "identifying", "generating" "providing" "searching", "storing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide systems and methods for providing message flow analysis for an enterprise service bus (ESB). A message flow analysis module is initialized on an ESB system.

In one embodiment, the message flow analysis module identifies messages exchanged in the ESB system in a time interval. The message flow analysis records a number of the identified messages exchanged in the time interval and generates a result that depicts the recorded number of the identified messages in the time interval. The result is stored in a database. The message flow analysis provides the result to a user.

Figure 1:
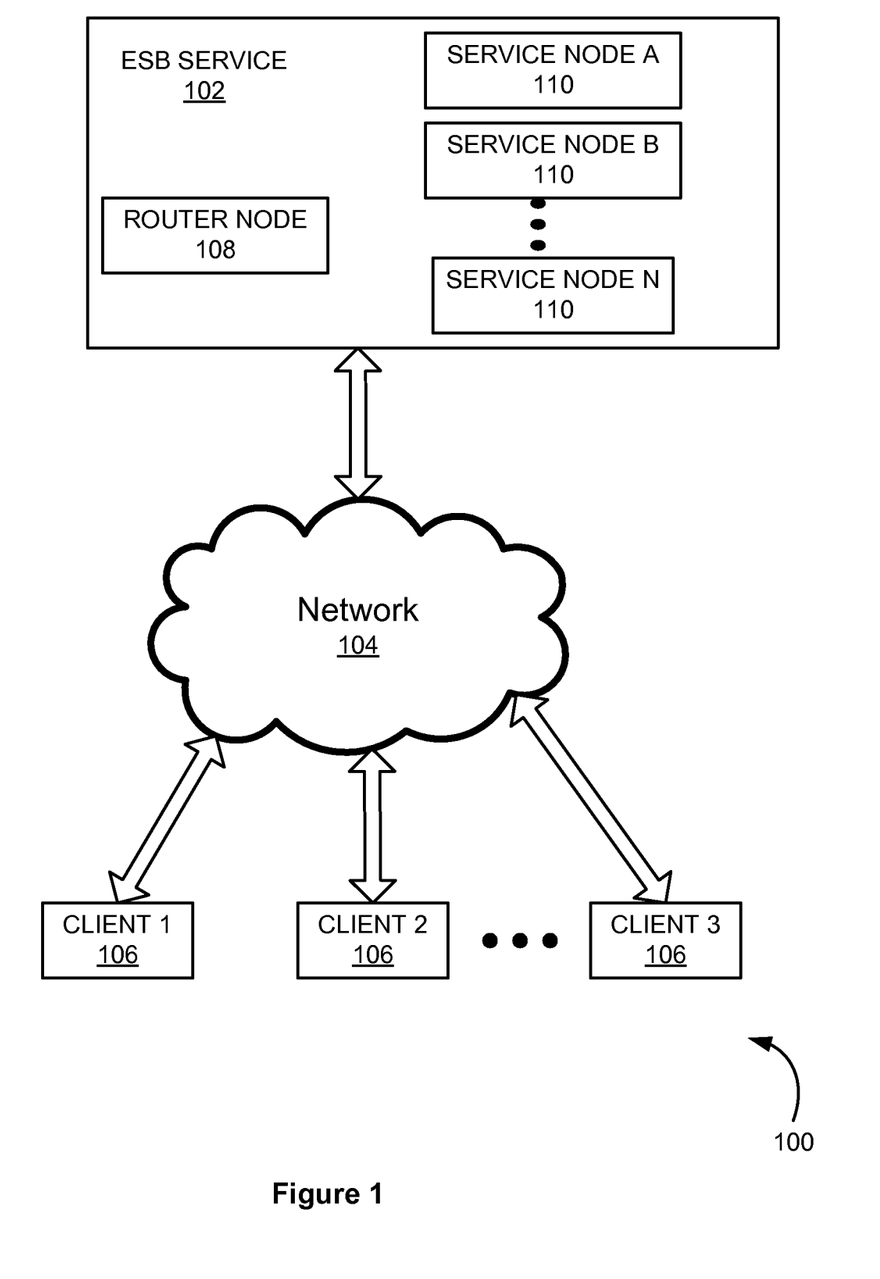
FIG. 1 illustrates an example of a network architecture in which embodiments of the invention may operate.

FIG. 1 illustrates an example of a network architecture 100 in which embodiments of the present invention may operate. The network architecture 100 may include external client devices (clients) 106, an Enterprise Service Bus (ESB) service 102 and a network 104. The clients 106 may be a computing devices such as, for example, desktop computers, personal computers (PCs), server computers, mobile phones, palm-sized computing devices, personal digital assistants (PDAs), tablet devices, etc.

The clients 106 are communicably coupled to the ESB service 102 via the network 104. Network 104 may be a public network (e.g., Internet) or a private network (e.g., Ethernet or a local area Network (LAN)). In one embodiment, the client 106 is a server of an enterprise, but is a "client" with respect to the ESB service 102.

In one embodiment, the ESB service 102 includes a set of inter-connected ESB nodes (not shown). Each ESB node is a piece of code that is deployed into running one or more instances of the ESB server. In one embodiment, the ESB service 102 includes at least one router node 108, and one or more service nodes 110 that provide the ESB functionality. ESB functionality are implementations of Enterprise Integration Patterns such as content-based routers, load-balanced queue receivers, or routing slips, which are implemented as custom messaging client code built on top of a messaging infrastructure. An ESB provides these same capabilities as built-in functionality, either as part of a bus directly or as an out-of-the-box service to be plugged into the bus. The details of the patterns are described in the book by Gregor Hohpe and Bobby Woolf, "Enterprise Integration Patterns: Designing, Building, and Deploying Messaging Solutions"; Addison-Wesley Signature Series, 2003.

Clients 106 interact with the ESB 102 by exchanging messages via standard protocols, e.g., File Transfer Protocol (FTP) and Hypertext Transfer Protocol (HTTP). Each client 106 runs client applications to generate messages that are processed by the router node 108 deployed on the ESB 102. Each client 106 may also include a graphic user interface (GUI) for viewing the results provided from the ESB service 102. A message is any type of communication which are usable and/or processable by nodes. The ESB service 102 executes the router node 108 for routing messages using techniques, such as, for example, static/deterministic routing, content-based routing, rules-based routing, and policy-based routing.

The ESB service 102 may also execute one or more service nodes 110 (e.g., by calling one or more methods contained in the code that implements the services of service nodes 110) to generate and receive messages. The services of each service node 110 may include system services such as, but not limited to, invocation support, mediation, messaging, process choreography, service orchestration, complex event processing, security (encryption and signing), reliable delivery, transaction management, management (e.g., monitoring, audit, logging, metering), and user defined services.

In one embodiment, the router node 108 receives the messages from clients 106, examines content of the received messages, applies rules to the content, and forwards, according to the applied rules, the messages to the one or more service nodes 110.

In another embodiment, the router node 108 receives messages generated by one or more of the service nodes 110. As discussed above, message is any type of communication which are usable and/or processable by the nodes. Some examples of the messages include, but not limited to, JBoss™ message, HTTP message, FTP message, and so on.

Although, the term "ESB Service" is used in the description, a person of ordinary skill in the art will appreciate that the embodiments described herein can be applied to any service that provides a deployed service to a client that communicates with the service by messages.

Figure 2:
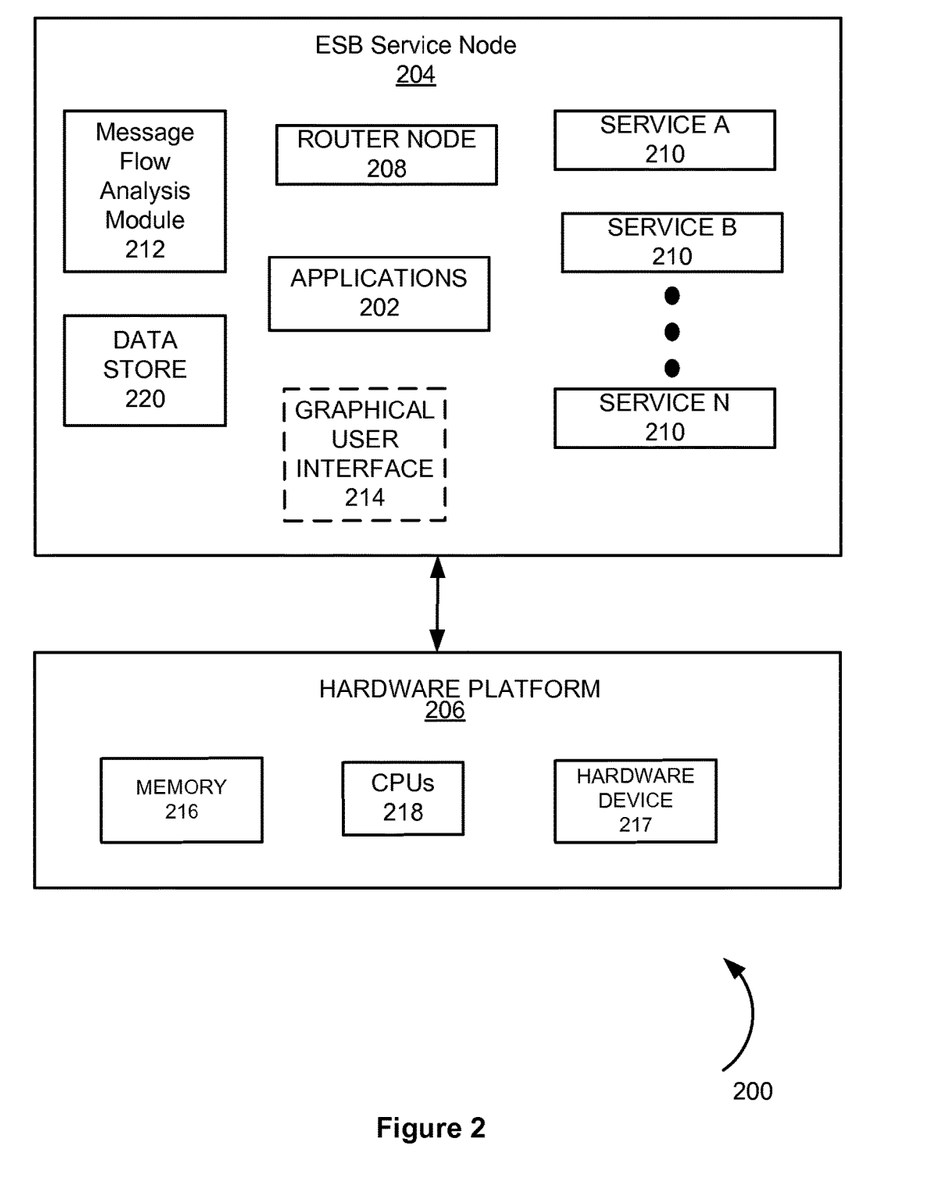
FIG. 2 is a block diagram of one embodiment of an Enterprise Service Bus (ESB) system.

Embodiments of the invention provide systems and methods for ESB 102 to provide message flow analysis. FIG. 2 is a block diagram of one embodiment of an ESB service that provides message flow analysis according to an embodiment of the invention. In one embodiment, ESB system 200 is the same as ESB 102 described with respect to FIG. 1.

In some embodiments, ESB system 200 is implemented using event-driven and standards-based message-oriented middleware in combination with message queues. In one embodiment, ESB system is a computing machine such as, for example, a server computer, a gateway computer or any other suitable computer system that is configurable for operating as an ESB system 200. As illustrated in FIG. 2, the ESB system 200 may include a hardware platform 206, on top of which runs an ESB service node 204 that executes functionality of the ESB service 200.

The hardware platform 206 may include one or more central processing units (CPUs) 218. The hardware platform 206 may also include additional hardware devices 217, such as network interface cards (NICs), sound or video adaptors, photo/video cameras, printer devices, keyboards, displays or any other suitable device intended to be coupled to a computer system. The hardware platform 206 may also include a memory 216. In one embodiment, the memory 216 comprises one or more hardware and software devices, which may be located internally and externally to the ESB system 200. Examples of memory 216 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.).

In some embodiments, the ESB service node 204 includes at least one router node 208, and one or more service nodes 210. In one embodiment, the router node 208 is same as the router node 108 of FIG. 1 and the one or more service nodes 210 are same the one or more service nodes 110 of FIG. 1.

The ESB service node 204 also includes a message flow analysis module 212. The message flow analysis module 212 may integrate with the applications 202 to identify a plurality of messages exchanged in the ESB system 200. In one embodiment, the applications include but not limited to, Web Shop that is quering some information, Enterprise System that needs integration, social network, etc. As discussed above, a message is any type of communication which are usable and/or processable by the nodes. Some examples of the messages include, but not limited to, JBoss™ message, FTP message and HTTP message etc. In some embodiments, the messages are exchanged between a client device and the router node 208. In some embodiments, the messages are exchanged between the router node 208 and one or more service nodes 210.

In some embodiments, the message flow analysis module 212 integrates with the applications 202 to record a number of messages exchanged in a time interval. In one embodiment, the numbers of messages are recorded in run-time. In some embodiments, the run-time includes, but not limited to, deploying of the ESB nodes into the ESB, start of the ESB, sending of the messages to the ESB by the clients. In some embodiments, the message flow analysis module 212 records the number of messages exchanged between a client device and the router node 208. In other embodiments, the message flow analysis module 212 records the number of messages exchanged between the router node 208 and the one or more service nodes 210. In one embodiment, the message flow analysis module 212 records the number of messages using a wedge function. The wedge function may be computed as a rate of messages exchanged between the two nodes in a time interval.

In one embodiment, the message flow analysis 212 integrates with the applications 202 to generate a result of the recorded number of messages exchanged in the time interval. In some embodiments, the message flow analysis generates the result using the wedge function.

In some embodiments, the message flow analysis module 212 integrates with the applications 202 to store the result of the recorded number of messages in a data store 220. In some embodiments, the message flow analysis module 212 integrates with the applications 202 to provide the result to a user. In one embodiment, the message flow analysis module 212 displays the result of the wedge function using the GUI 214. In one embodiment, the result is displayed as an image. In another embodiment, the result is displayed as mathematical graph. In another embodiment, it is displayed as a table. ***

Figure 3:
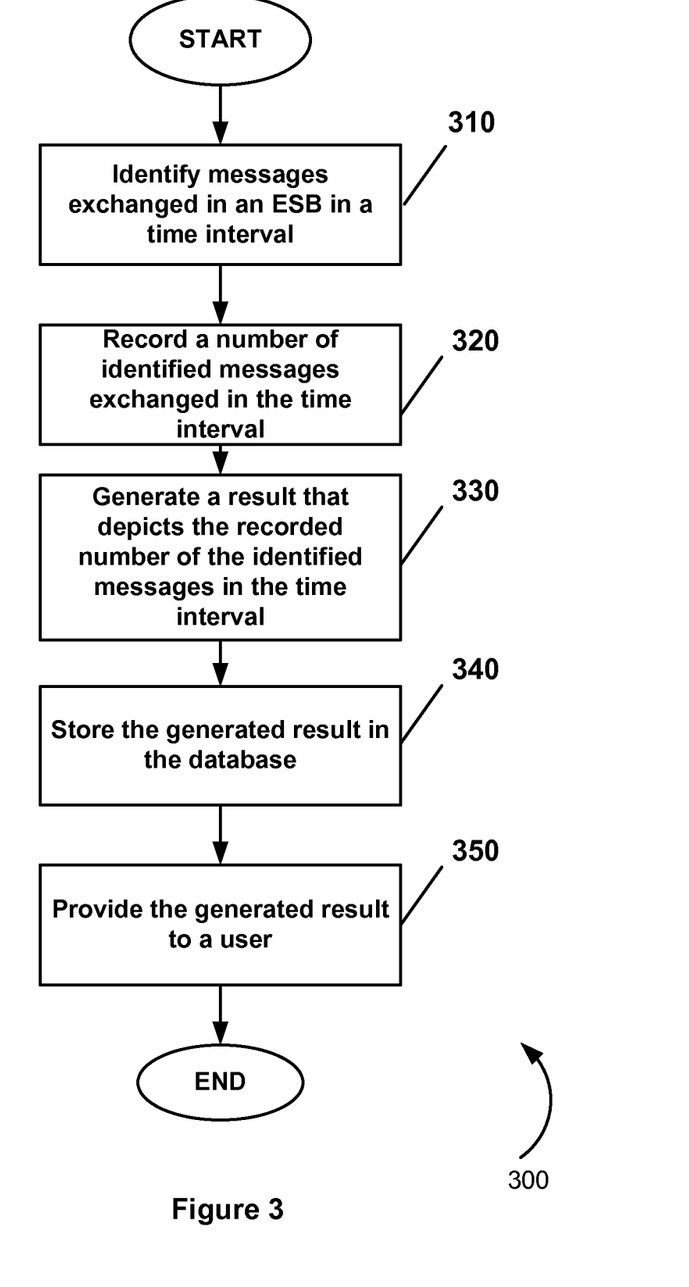
FIG. 3 is a flow diagram of one embodiment of a method for providing message flow analysis for the ESB system.

FIG. 3 is a flow diagram illustrating a method 300 for providing message flow analysis for an ESB system according to an embodiment of the present invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by the message flow analysis module 212 of ESB system 200 of FIG. 2.

Method 300 begins at block 310 where messages exchanged in an ESB system in a time interval are identified. In one embodiment, the messages exchanged are messages received, generated and forwarded by a router of the ESB. In one embodiment, the time interval is configured by an administrator. In some embodiments, the time interval is fixed for the computations of WEDGE function and it defines a time interval that is necessary to compute rate of messages (number of messages per second). At block 320, a number of messages exchanged in the identified plurality of messages are recorded in the time interval. The recordation of messages may occur during run-time. As discussed above, run-time includes, but not limited to, deploying of the ESB nodes into the ESB, start of the ESB, sending of the messages to the ESB by the clients.

In some embodiments, the number of exchanged messages is recorded using a wedge function. A wedge function may be computed as a rate of messages exchanged between two nodes in a time interval. For example, when examining a number of messages received by the router (R) from the client (C) in the time interval, the following wedge function may be used: wedge (t, 'client', 'router')=5, where t=time interval, 'client'=C, and 'router'=R.

In another example, when examining a number of messages generated by the router and forwarded to the service nodes in the time interval, a wedge function may also be used as follows. Assume the service nodes include at least a service node A (A) and a service node B (B). An example of the wedge function between the router (R) and the service node A (A) at the time, t is: wedge (t, 'router', 'service node A')=2, where t=time interval, 'router'=R and 'service node A'=A. Similarly, an example of wedge function between the router and the service node B (B) at the time t, wedge (t, 'router', 'service node B')=4, where t=time interval, 'router'=R and 'service node B'=B.

At block 330, a result is generated that depicts the recorded number of the identified messages in the time interval. In some embodiments, the result is generated from the wedge function using the time interval t. In one embodiment, the result is generated from the wedge function between the client and the router and from the wedge function between the router and the one or more service nodes in the time interval t.

Figure 4:
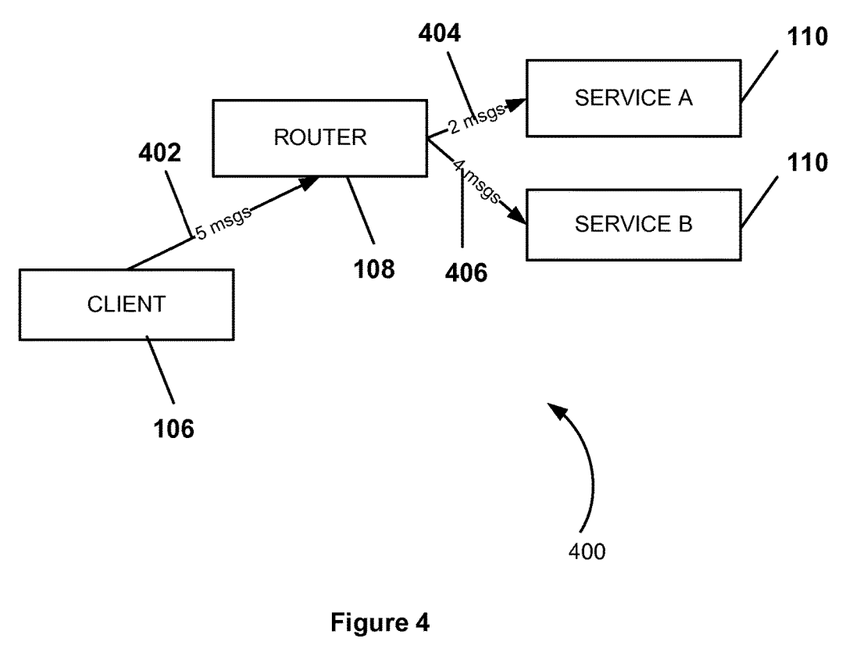
FIG. 4 is an example of a result in an image format representing a message flow analysis for the ESB system.

In one embodiment, the result is an image representing the recorded number of messages in the time interval, t. FIG. 4 illustrates an example of an image 400 generated at time interval, t using the wedge function. As shown in image 400, in the time interval, t, 5 messages (msgs) 402, sent by the client 106 to the router 108 were recorded, 2 messages 404, sent by the router 108 to the service A 110 were recorded and 4 messages 406 sent from the router 110 to the service B 110 were recorded. One skilled in the art will appreciate that other formats than an image may be used to provide the message flow analysis result including, but not limited to, mathematical graph, table of results.

At block 340, the result generated in the time interval is stored in the database. At block 350, the result is provided to a user. In one embodiment, the result represented by the image 400 as illustrated in FIG. 4 is displayed to the user. In other embodiments, different result formats may be provided to the user. In some embodiments, the method 300 is repeated for different time intervals, t.

Figure 5:
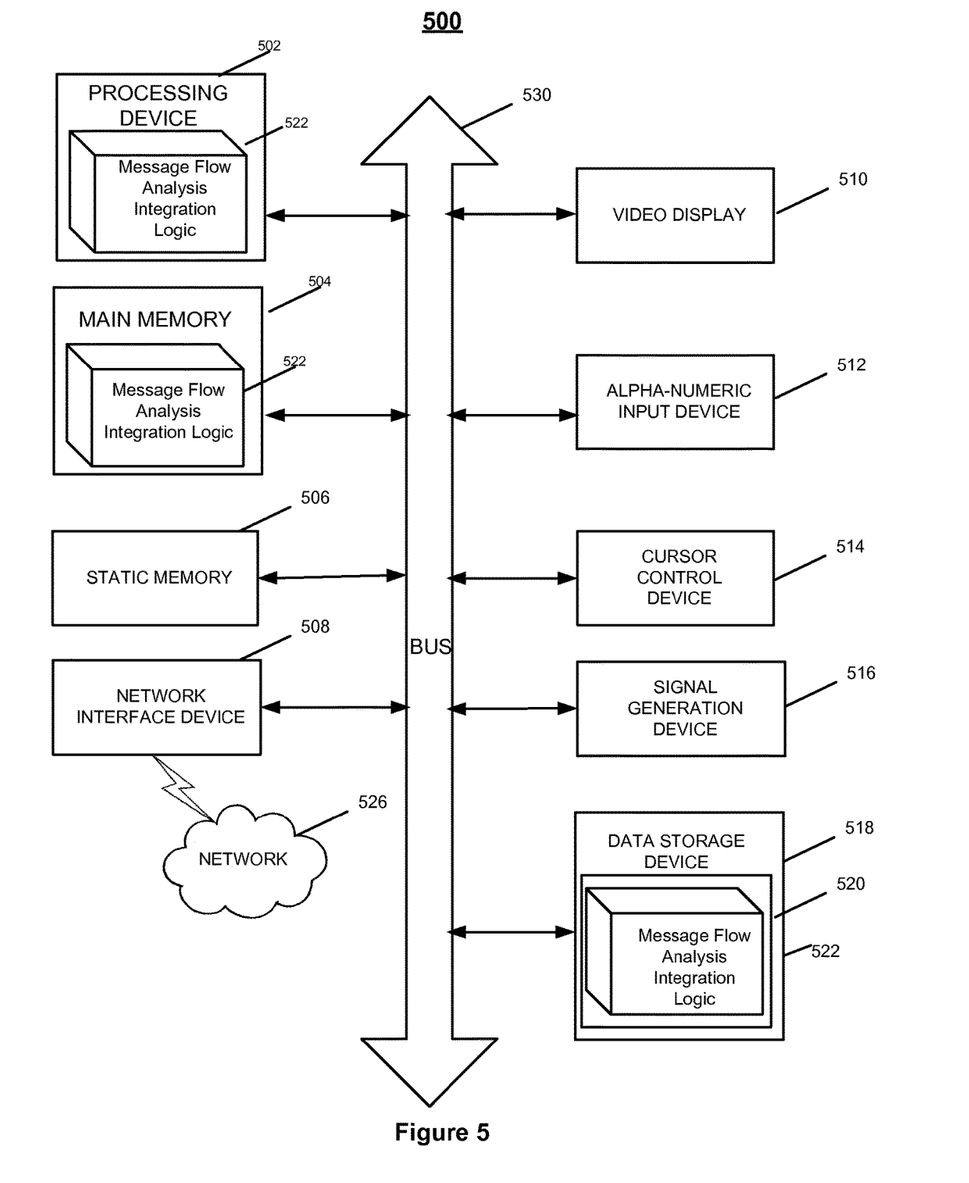
FIG. 5 illustrates a block diagram representation of a machine in the example form of a computer system.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute message flow analysis logic 522 for performing the operations and steps discussed herein. In one embodiment, message flow analysis module 212 described with respect to FIG. 2 performs the message flow analysis logic 522.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium (or more specifically a computer-readable storage medium) 520 on which is stored one or more sets of instructions (e.g. message flow analysis module logic 522) embodying any one or more of the methodologies of functions described herein, such as method 300 for providing dependency injection in a BPM system described with respect to FIG. 3. The message flow analysis module logic 522 may also reside, completely or at least partially, within the memory 505 and/or within the processing device 502 during execution thereof by the computer system 500; the memory 505 and the processing device 502 also constituting machine-accessible storage media.

The machine-readable storage medium 520 may also be used to store the message flow analysis module logic 522 persistently containing methods that call the above applications. While the machine-accessible storage medium 520 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    identifying, by a processing device of a first node of a plurality of interconnected nodes of an enterprise service bus (ESB) system, messages exchanged in the ESB system in a time interval;
    examining, by the processing device, message flow of the messages between the plurality of interconnected nodes;
    recording, via application of a wedge function to the messages by the processing device:
        a first number of the messages exchanged with a client node of the plurality of interconnected nodes; and
        a second number of the messages exchanged with a service node of the plurality of interconnected nodes, wherein the wedge function calculates a rate of the message flow during the time interval;
    storing, by the processing device in a database stored in memory of the first node, the first number of the messages in relation to a first indicator indicative of the client node and the second number of the messages in relation to a second indicator indicative of the service node;
    identifying, by the processing device, a route for the messages in view of a rule applied to content of respective ones of the messages;
    routing, by the processing device, each of the messages to the client node or the service node in view of the route;
    generating, by the processing device via a graphical user interface, a graph object that translates:
        the first number of the messages and the first indicator into a first relational graph illustrative of first quantifiable message flow between the client node and the first node of the plurality of interconnected nodes; and
        the second number of the messages and the second indicator into a second relational graph illustrative of second quantifiable message flow between the first node and the service node of the plurality of interconnected nodes; and
    delivering, by the processing device, the graph object to a computing device representative of the client node for display in a display device of the computing device.

2. The method of claim 1 wherein the first number and the second number of the messages are recorded during run-time.

3. The method of claim 1 wherein the messages represent communication that is processable by one or more of the plurality of interconnected nodes.

4. The method of claim 1 wherein the wedge function computes a current rate of the messages exchanged between at least two nodes of the plurality of interconnected nodes in the time interval.

5. The method of claim 1 wherein the client node is external to the ESB system.

6. A system, comprising:
a memory; and
a processing device of a first node of a plurality of interconnected nodes of an enterprise service bus (ESB) system, wherein the processing device is operatively coupled to the memory to:
identify messages exchanged with the first node in the ESB system in a time interval;
examine message flow of the messages between the plurality of interconnected nodes;
recording, via application of a wedge function to the messages:
a first number of the messages exchanged with a client node of the plurality of interconnected nodes; and
a second number of the messages exchanged with a service node of the plurality of interconnected nodes, wherein the wedge function calculates a rate of the message flow during the time interval;
store, in a database in the memory, the first number of the messages in relation to a first indicator indicative of the client node and the second number of the messages in relation to a second indicator indicative of the service node;
identify a route for the messages in view of a rule applied to content of respective ones of the messages;
route each of the messages to the client node or the service node in view of the route;
generate, via a graphical user interface, a graph object that translates:
the first number of the messages and the first indicator into a first relational graph illustrative of first quantifiable message flow between the client node and the first node of the plurality of interconnected nodes; and
the second number of the messages and the second indicator into a second relational graph illustrative of second quantifiable message flow between the first node and the service node of the plurality of interconnected nodes; and
deliver the graph object to a computing device representative of the client node for display in a display device of the computing device.

7. The system of claim 6 wherein the first number and the second number of the messages are recorded during run-time.

8. The system of claim 6 wherein the messages represent communication that is processable by one or more of the plurality of interconnected nodes.

9. The system of claim 6 wherein the wedge function computes a current rate of the messages exchanged between at least two nodes of the plurality of interconnected nodes in the time interval.

10. The system of claim 6 wherein the client node is external to the ESB system.

11. A non-transitory machine-readable storage medium comprising data that, when accessed by a processing device, cause the processing device to:
identify, by the processing device of a first node of a plurality of interconnected nodes of an enterprise service bus (ESB) system, messages exchanged in the ESB system in a time interval;
examine message flow of the messages between the plurality of interconnected nodes;
record, via application of a wedge function to the messages:
a first number of the messages exchanged with a client node of the plurality of interconnected nodes; and
a second number of the messages exchanged with a service node of the plurality of interconnected nodes, wherein the wedge function calculates a rate of the message flow during the time interval;
store, by the processing device in a database stored in memory of the first node, the first number of the messages in relation to a first indicator indicative of the client node and the second number of the messages in relation to a second indicator indicative of the service node;
identify a route for the messages in view of a rule applied to content of respective ones of the messages;
route each of the messages to the client node or the service node in view of the route;
generate, via a graphical user interface, a graph object that translates:
the first number of the messages and the first indicator into a first relational graph illustrative of first quantifiable message flow between the client node and the first node of the plurality of interconnected nodes; and
the second number of the messages and the second indicator into a second relational graph illustrative of second quantifiable message flow between the first node and the service node of the plurality of interconnected nodes; and
deliver the graph object to a computing device representative of the client node for display in a display device of the computing device.

12. The non-transitory machine-readable storage medium of claim 11, wherein the first number and the second number of the messages are recorded during run-time.

13. The non-transitory machine-readable storage medium of claim 11 wherein the messages represent communication that is processable by one or more of the plurality of interconnected nodes.

14. The non-transitory machine-readable storage medium of claim 11 wherein the wedge function computes a current rate of the messages exchanged between at least two nodes of the plurality of interconnected nodes in the time interval.

* * * * *